United States Patent
Han et al.

(10) Patent No.: US 12,546,061 B2
(45) Date of Patent: Feb. 10, 2026

(54) CERAMIC PAPER AND METHOD FOR PREPARING SAME

(71) Applicant: ENVIONEER CO., LTD, Jecheon-si (KR)

(72) Inventors: Jeong Cheol Han, Suwon-si (KR); Seong Eun Park, Suwon-si (KR); Byeong Joon Lee, Daegu (KR); Ji Soo Won, Jecheon-si (KR); Woong Gi Jang, Wonju-si (KR); Hye Yeong Tak, Jecheon-si (KR)

(73) Assignee: ENVIONEER CO., LTD, Jecheon-si (KR)

( * ) Notice: Subject to any disclaimer, the term of this patent is extended or adjusted under 35 U.S.C. 154(b) by 215 days.

(21) Appl. No.: 18/265,144

(22) PCT Filed: Jun. 2, 2022

(86) PCT No.: PCT/KR2022/007881
§ 371 (c)(1),
(2) Date: Jun. 2, 2023

(87) PCT Pub. No.: WO2023/042997
PCT Pub. Date: Mar. 23, 2023

(65) Prior Publication Data
US 2024/0003088 A1 Jan. 4, 2024

(30) Foreign Application Priority Data

Sep. 14, 2021 (KR) .................. 10-2021-0122160

(51) Int. Cl.
*D21H 13/38* (2006.01)
*C04B 35/80* (2006.01)
(Continued)

(52) U.S. Cl.
CPC ............. *D21H 13/38* (2013.01); *C04B 35/80* (2013.01); *D21H 13/46* (2013.01); *D21H 17/37* (2013.01); *D21H 17/41* (2013.01); *D21H 17/63* (2013.01)

(58) Field of Classification Search
CPC ........ D21H 13/38; D21H 13/46; D21H 17/37; D21H 17/41; D21H 17/63; D21H 13/36; C04B 35/80
See application file for complete search history.

(56) References Cited

U.S. PATENT DOCUMENTS 3,996,145 A * 12/1976 Hepburn .................. C04B 26/02
264/211.14
4,389,282 A * 6/1983 Yonushonis ........... D21H 13/36
162/168.3

(Continued)

FOREIGN PATENT DOCUMENTS

CN 100385072 C 4/2006
CN 111118959 A 5/2020
(Continued)

*Primary Examiner* — Anthony Calandra
(74) *Attorney, Agent, or Firm* — Birch, Stewart, Kolasch & Birch, LLP

(57) ABSTRACT

The present invention relates to a ceramic paper and a method for preparing same, and more specifically, to a ceramic paper and a method for preparing same, the ceramic paper being characterized by comprising polycrystalline alumina fibers, a binder, a retention agent, a dispersing agent, and a thickening agent.

8 Claims, 1 Drawing Sheet

(51) Int. Cl.
*D21H 13/46* (2006.01)
*D21H 17/37* (2006.01)
*D21H 17/41* (2006.01)
*D21H 17/63* (2006.01)

(56) References Cited

U.S. PATENT DOCUMENTS

| | | | |
|---|---|---|---|
| 2015/0052880 A1 | 2/2015 | Vandervoort | |
| 2018/0044857 A1* | 2/2018 | Kimoto | F16D 13/64 |
| 2023/0167610 A1* | 6/2023 | Plummer | D21H 17/74 |
| | | | 162/146 |

FOREIGN PATENT DOCUMENTS

| | | | |
|---|---|---|---|
| CN | 111848105 A | 10/2020 | |
| JP | 48-614 B | 1/1973 | |
| JP | 57-18309 B2 | 4/1982 | |
| JP | 61-201679 A | 9/1986 | |
| JP | 62-9181 A | 1/1987 | |
| JP | 62-41399 A | 2/1987 | |
| JP | 62-93111 A | 4/1987 | |
| JP | 63-120199 A | 5/1988 | |
| JP | 5-86596 A | 4/1993 | |
| JP | 9-92283 A | 4/1997 | |
| JP | 2000-73293 A | 3/2000 | |
| JP | 2013-63439 A | 4/2013 | |
| JP | 2016-534246 A | 11/2016 | |
| JP | 2018-115409 A | 7/2018 | |
| JP | 2020-165065 A | 10/2020 | |
| KR | 10-1991-0006187 A | 4/1991 | |
| KR | 10-2006-0078683 A | 7/2006 | |
| KR | 10-2006-0084124 A | 7/2006 | |
| KR | 10-0576985 B1 | 7/2006 | |
| KR | 10-2007-0052542 A | 5/2007 | |
| KR | 10-2007-0062696 A | 6/2007 | |
| KR | 10-2015-0066857 A | 6/2015 | |
| WO | WO-2019159943 A1 * | 8/2019 | D06M 23/08 |
| WO | WO-2019163659 A1 * | 9/2019 | C04B 28/02 |

* cited by examiner

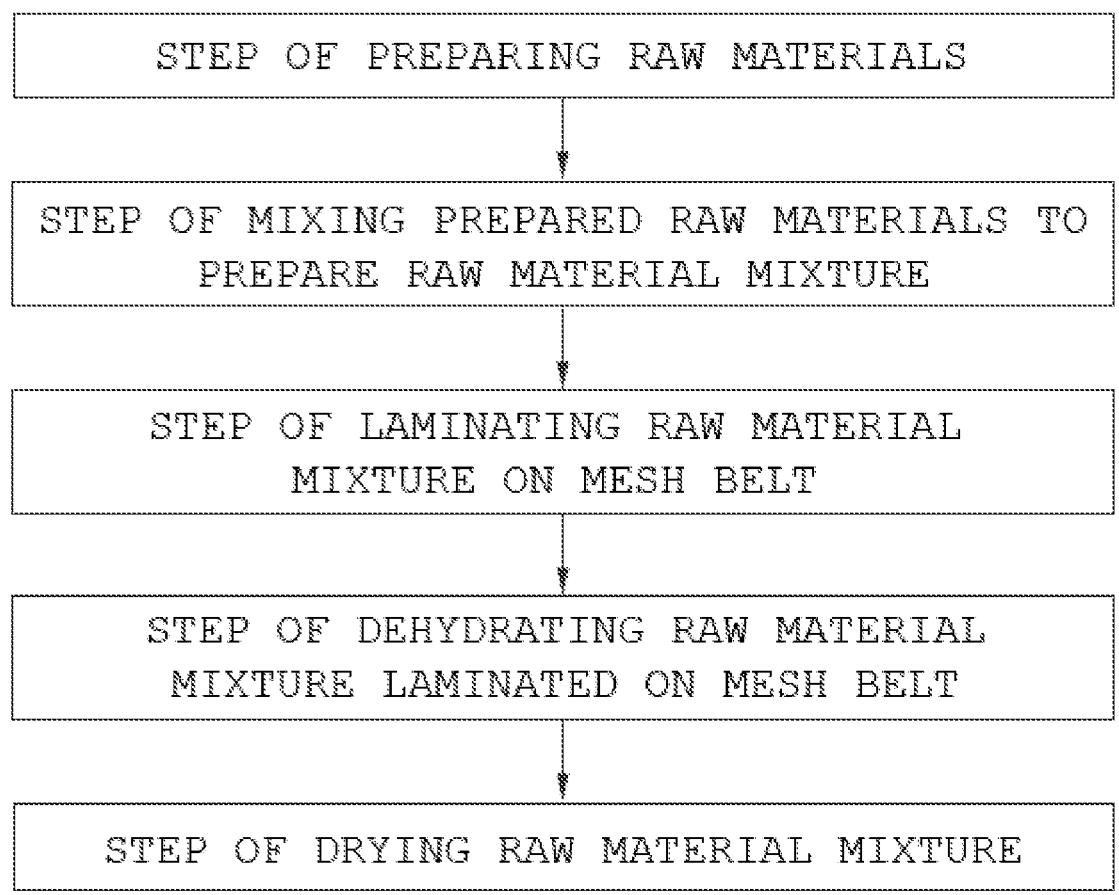

CERAMIC PAPER AND METHOD FOR PREPARING SAME

CROSS REFERENCE TO RELATED APPLICATIONS

This application is the National Phase of PCT International Application No. PCT/KR2022/007881, filed on Jun. 2, 2022, which claims priority under 35 U.S.C. 119 (a) to Patent Application No. 10-2021-0122160, filed in the Republic of Korea on Sep. 14, 2021, all of which are hereby expressly incorporated by reference into the present application.

TECHNICAL FIELD

The present invention relates to ceramic paper and a method of manufacturing the same, and more particularly to ceramic paper having excellent heat resistance and shapeability while having a small thickness such that increase in volume is minimized when mounted in a battery module or a battery pack and a method of manufacturing the same.

BACKGROUND ART

Most conventional thermal interface material or heat insulating material products that retard flames are formed in the shape of a non-woven fabric based on alumino-silicate ceramic fiber.

Fabrics are manufactured using a dry-laid type needle punching method, a carding method, a lamination method, or a molding method. However, there are problems in that productivity is low, transport is difficult due to large volume, and air pollution occurs and worker health is harmed due to fine ceramic dust during the use thereof.

Meanwhile, ceramic paper has been used as a part requiring heat resistance and heat insulation, such as a sealing material of a gasket, an expansion pad filler of a fireproof insulation wall, a protective tube of a molten metal temperature sensor, a filler of each of various kinds of refractories, or a heat insulating material of a vehicle exhaust gas purifier.

In recent years, great change in energy sources for mobilities has been realized in connection with environmental issues. As a result, demand for internal combustion engine vehicles has decreased, whereas demand for electric vehicles or fuel cell vehicles (PHEVs, BEVs, hybrid vehicles, or hydrogen vehicles) has increased. For a secondary battery-based electric vehicle, however, fire may break out in a rechargeable battery, which causes loss of life as well as property damage.

Accordingly, there is an urgent need to develop a part or material capable of preventing battery fire or inhibiting spread of flames such that time necessary to escape from a fire site can be secured when fire breaks out due to thermal runaway.

PRIOR ART DOCUMENTS (Patent Document 1) Korean Patent Application Publication No. 2006-0078683
(Patent Document 2) Korean Patent Application Publication No. 1991-0006187
(Patent Document 3) Korean Patent Application Publication No. 2015-0066857
(Patent Document 4) Korean Patent Application Publication No. 2006-0084124

DISCLOSURE

Technical Problem

The present invention has been made in view of conventional problems, and it is an object of the present invention to provide ceramic paper having excellent heat resistance and shapeability and a method of manufacturing the same.

It is another object of the present invention to provide ceramic paper having a small thickness and flexibility and a method of manufacturing the same.

Technical Solution

In order to accomplish the above objects, ceramic paper according to the present invention includes polycrystalline alumina fiber, a binder, retention aids, a dispersant, and a thickening agent.

Also, in the ceramic paper according to the present invention, the binder may be constituted by an organic binder and an inorganic binder, the retention aids may be constituted by polyaluminium chloride (PAC) and cationic-polyacrylamide (C-PAM).

Also, in the ceramic paper according to the present invention, the polycrystalline alumina fiber may have an alumina content of 70% or more, a fiber diameter of 4 to 10 μm, a loss of ignition (LOI) of 0.1% or less, and a thermal conductivity of 0.44 W/mK or less at a temperature of 1,200° C., the organic binder may be polyvinyl alcohol (PVA) configured to have the shape of chopped fiber and having a fineness of 0.3 to 3.0 dtex, a fiber length of 2 to 6 mm, and a solution temperature in water of 60 to 80° C., the inorganic binder may be silica sol or alumina sol, the dispersant may be a polyethylene glycol (PEG)-based nonionic surfactant, and the thickening agent may be polyethylene oxide (PEO).

Also, in the ceramic paper according to the present invention, the polycrystalline alumina fiber, the organic binder, the inorganic binder, PAC, C-PAM, the dispersant, and the thickening agent may be mixed at a weight ratio of 70 to 95:3 to 18:3 to 12:2 to 6:1 to 2:1 to 3:0.2 to 2.0.

Also, in the ceramic paper according to the present invention, the polycrystalline alumina fiber, the organic binder, the inorganic binder, PAC, C-PAM, the dispersant, and the thickening agent may be mixed at a weight ratio of 73 to 92:3 to 17:3 to 12:2 to 4:1.2 to 1.8:1.2 to 2.7:0.3 to 1.7.

Also, in the ceramic paper according to the present invention, a thickness of 275 to 300 μm, a porosity of 6.8 to 7.2 $cm^3$/g, and a density of 13 to 15 $kg/m^3$ may be satisfied at a basis weight of 39 to 40.0 $g/m^2$.

In addition, a ceramic paper manufacturing method according to the present invention includes (a) preparing raw materials, (b) mixing the prepared raw materials to prepare a raw material mixture, (c) laminating the raw material mixture on a mesh belt, (d) dehydrating the raw material mixture laminated on the mesh belt, and (e) drying the raw material mixture, wherein the raw materials include polycrystalline alumina fiber, a binder, retention aids, a dispersant, and a thickening agent.

Also, in the ceramic paper manufacturing method according to the present invention, in step (b), 9,900 to 11,000 parts by weight of water as a solvent, 70 to 95 parts by weight of the polycrystalline alumina fiber, 3 to 18 parts by weight of an organic binder, 3 to 12 parts by weight of an inorganic binder, 2 to 6 parts by weight of polyaluminium chloride (PAC), 1 to 2 parts by weight of cationic-polyacrylamide (C-PAM), 1 to 3 parts by weight of the dispersant, and 0.2 to 2.0 parts by weight of the thickening agent may be mixed.

Also, in the ceramic paper manufacturing method according to the present invention, in step (b), the polycrystalline alumina fiber and the organic binder may be simultaneously mixed, and then the inorganic binder, polyaluminium chloride (PAC), and cationic-polyacrylamide (C-PAM) may be sequentially mixed.

Advantageous Effects

As is apparent from the above description, ceramic paper according to the present invention and a method of manufacturing the same have an advantage in that polycrystalline fiber having an alumina content of 70% or more is used as the main ingredient, whereby heat resistance is excellent.

In addition, the ceramic paper according to the present invention and the method of manufacturing the same have an advantage in that the ceramic paper is easily shapeable and the thickness of the manufactured paper is small, whereby it is possible to minimize increase in volume when mounted in a battery module or a battery pack.

Furthermore, the ceramic paper according to the present invention and the method of manufacturing the same have an advantage in that density and porosity are excellent, whereby it is possible to contribute to improvement in fuel efficiency through weight reduction when being applied to a battery module for vehicles.

DESCRIPTION OF DRAWINGS

FIG. 1 is a flowchart illustrating a ceramic paper manufacturing method according to a preferred embodiment of the present invention.

BEST MODE

Hereinafter, the present invention will be described in more detail with reference to preferred embodiments of the present invention and the drawings. This means that the embodiments are described in detail to such an extent that a person having ordinary skill in the art to which the present invention pertains can easily implement the invention and do not limit the technical idea and category of the present invention.

All terms, including technical and scientific terms, have the same meanings as those commonly understood by one of ordinary skill in the art to which the present invention pertains, unless otherwise defined. Commonly used terms, such as those defined in typical dictionaries, should be interpreted as being consistent with the contextual meaning of the relevant art, and are not to be construed in an ideal or overly formal sense unless expressly defined to the contrary.

Hereinafter, ceramic paper according to the present invention and a method of manufacturing the same will be described in detail.

First, ceramic paper according to the present invention includes ceramic fiber, a binder, retention aids, a dispersant, and a thickening agent.

Ceramic fiber is a collective name, covering artificial inorganic fiber having alumina silica as the main ingredient. The ceramic fiber is classified into amorphous fiber having an alumina content of 40 to 60% and polycrystalline fiber having an alumina content of 70% or more. In addition, the ceramic fiber is classified into alumina fiber and mullite fiber based on a synthesis method; however, the term "alumina fiber" is generally used.

In the present invention, polycrystalline fiber having an alumina content of 70% or more is used. Also, it is preferable to use polycrystalline fiber having a fiber diameter of 4 to 10 μm, more preferably 5 to 7 μm, a loss of ignition (LOI) of 0.1% or less, a shot content (%), which causes deterioration in appearance characteristics and quality of a product, of 2%, a thermal conductivity (W/mK) of 0.15 or less at a temperature of 600° C., 0.31 or less at a temperature of 1,000° C., and 0.44 or less at a temperature of 1,200° C., and a heat shrinkage of 1% or less at a temperature of 1,200° C. for 8 hours and 1% or less at a temperature of 1,600° C. for 8 hours.

The binder is used to increase mechanical strength of paper. It is preferable to use both an organic binder and an inorganic binder. The reason for this is that it is possible to maintain strength and to inhibit paper fracture when a web is formed and, particularly, the inorganic binder is capable of increasing binding force of ceramic fiber.

It is preferable to use polyvinyl alcohol (PVA) having the shape of chopped fiber as the organic binder. The reason for this is that, if a liquid product is used, the degree of retention is low, whereby the input amount thereof is increased, and therefore dehydration is reduced, processing cost due to increase of waste water load is increased, and deterioration of quality, such as corruption due to long-term storage and use, occurs. It is preferable for chopped fiber to have a fineness of 0.3 to 3.0 dtex, more preferably 1.0 to 2.0 dtex, a fiber length of 2 to 6 mm, more preferably 3 to 5 mm, and a solution temperature in water of 60 to 80° C.

Silica sol or alumina sol is used as the inorganic binder such that stable binding force can be exhibited even at a high temperature.

The retention aids are added in order to prevent leakage of ceramic fiber, which is expensive, during a manufacturing process, such as drying and dehydration.

Specifically, polyaluminium chloride (PAC) and cationic-polyacrylamide (C-PAM) may be used alone or in a mixed state. When polyaluminium chloride (PAC) and cationic-polyacrylamide (C-PAM) are used together, however, the amount of C-PAM that is used may be reduced, whereby it is possible to reduce cost and to reduce waste water load. In addition, it is possible to inhibit reduction in effect of C-PAM due to an in-situ anionic material. Consequently, when the two materials are used in a mixed state, not alone, it is possible to increase the retention rate of the ceramic fiber.

It is preferable for PAC to have a solid content of 10 to 18%, more preferably 10%.

Also, it is preferable for C-PAM to have a weight-average molecular weight (Mw) of 6 million to 10 million, more preferably about 10 million.

It is preferable to use a surfactant, more specifically a polyethylene glycol (PEG)-based nonionic surfactant containing 7 to 9 mole of ethylene oxide (EO), as the dispersant configured to smoothly induce dispersion of the ceramic fiber in water, thereby inhibiting a bundle phenomenon.

The thickening agent is added in order to maximize the effect of dispersion, and polyethylene oxide (PEO) may be used as the thickening agent. In a paper manufacturing process, a polyethylene oxide product having a molecular weight of 2 to 3 million is generally used, whereas polyethylene oxide having a molecular weight of about 5 million is used in the present invention. The reason for this is that specific gravity of the ceramic fiber is high, and therefore retention thereof is difficult.

Meanwhile, it is preferable to mix the ceramic fiber, the organic binder, the inorganic binder, PAC, C-PAM, the dispersant, and the thickening agent, which are raw materials described above, at a weight ratio of 70 to 95:3 to 18:3 to 12:2 to 6:1 to 2:1 to 3:0.2 to 2.0, more preferably 73 to 92:3 to 17:3 to 12:2 to 4:1.2 to 1.8:1.2 to 2.7:0.3 to 1.7, based on 10,000 L of water, which is a solvent.

If the content of the ceramic fiber deviates from the above range, permeability of a non-woven fabric is reduced, whereby commercialization is difficult. If the content of ceramic fiber is greater than the above range, dispersity is reduced, whereby surface paper formation becomes nonuniform, and paper dust is generated. For these reasons, it is preferable for the content of the ceramic fiber to be within the above range.

If the content of the organic binder deviates from the above range, wet strength is lowered, whereby paper fracture may occur, or dispersion and dehydration of the inorganic fiber are hindered, whereby productivity may be reduced and paper formation may be impeded. For these reasons, it is preferable for the content of the organic binder to be within the above range.

If the content of the inorganic binder deviates from the above range, heat resistance of a product may be reduced or dehydration of the product may be reduced and the density of the product may be reduced. For these reasons, it is preferable for the content of the inorganic binder to be within the above range.

If the content of PAC deviates from the above range, the input amount of C-PAM, which is expensive, is increased, whereby cost and dehydration may be badly affected or the effect of C-PAM may be reduced. For these reasons, it is preferable for the content of PAC to be within the above range.

If the content of C-PAM deviates from the above range, dehydration of the inorganic fiber is reduced and paper formation is deteriorated, or dispersion of the inorganic fiber is impeded, whereby paper formation may be deteriorated and strength may be reduced due to increase of a bundle phenomenon. For these reasons, it is preferable for the content of C-PAM to be within the above range.

If the content of the dispersant deviates from the above range, dispersion of the inorganic fiber is reduced, whereby quality may be deteriorated, or in-situ contamination occurs due to the dispersant and dispersion of the raw materials is reduced. For these reasons, it is preferable for the content of the dispersant to be within the above range.

If the content of the thickening agent deviates from the above range, the viscosity of the in-situ solvent is low, whereby dispersion of the inorganic fiber is impeded, or dehydration of the inorganic fiber is reduced and paper formation quality is deteriorated due to increase of a bundle phenomenon. For these reasons, it is preferable for the content of the thickening agent to be within the above range.

When the above mixing ratio is satisfied, therefore, physical properties required for ceramic paper, such as small thickness, high wet tensile strength, high retention rate, low porosity, and low density, are satisfied.

Next, a ceramic paper manufacturing method according to the present invention will be described.

FIG. 1 is a flowchart illustrating a ceramic paper manufacturing method according to a preferred embodiment of the present invention.

As shown in FIG. 1, the ceramic paper manufacturing method includes (a) a step of preparing raw materials, (b) a step of mixing the prepared raw materials to prepare a raw material mixture, (c) a step of laminating the raw material mixture on a mesh belt, (d) a step of dehydrating the raw material mixture laminated on the mesh belt, and (e) a step of drying the raw material mixture.

Specifically, in step (a), which is a step of preparing raw materials, ceramic fiber, an organic binder, an inorganic binder, PAC, C-PAM, a dispersant, a thickening agent, and a solvent are prepared.

The solvent is provided in order to uniformly mix the raw materials, and water may be used as the solvent.

The ceramic fiber, the organic binder, the inorganic binder, PAC, C-PAM, the dispersant, and the thickening agent were described above in detail, and therefore a duplicate description thereof will be omitted.

In step (b), which is a step of mixing the prepared raw materials to prepare a raw material mixture, first, the water, the dispersant, and the thickening agent are introduced into a pulper and are stirred for a predetermined time. The reason for this is that it is necessary to create an environment in which the ceramic fiber can be individually dispersed without a bundle phenomenon.

Subsequently, the ceramic fiber and the organic binder are simultaneously introduced into the pulper and are stirred at 700 to 800 rpm for 8 to 12 minutes. The reason that the ceramic fiber and the organic binder are simultaneously introduced into the pulper is that it is possible to improve a mixing effect by securing stirring time for the ceramic fiber and the organic binder and to improve productivity by minimizing the amount of undispersed raw materials and reducing on-site working time.

Subsequently, the inorganic binder and the retention aids are further supplied to the pulper and are stirred at 700 to 800 rpm for 8 to 12 minutes to prepare a raw material mixture. At this time, it is preferable for the inorganic binder, PAC, and C-PAM to be sequentially introduced into the pulper, i.e. at certain intervals of time.

The reason that the inorganic binder, PAC, and C-PAM are sequentially supplied to the pulper is that it is necessary to sufficiently disperse the respective raw materials in water and particularly to secure solubility of a polymer material, whereby it is necessary to sufficiently open a polymer chain and to maximize reactivity therethrough.

Here, it is preferable to mix the ceramic fiber, the organic binder, the inorganic binder, PAC, C-PAM, the dispersant, and the thickening agent, which are raw materials described above, at a weight ratio of 70 to 95:3 to 18:3 to 12:2 to 6:1 to 2:1 to 3:0.2 to 2.0, more preferably 73 to 92:3 to 17:3 to 12:2 to 4:1.2 to 1.8:1.2 to 2.7:0.3 to 1.7, based on 10,000 L of water, which is a solvent.

Meanwhile, it is preferable for the solvent, i.e. water, to be preheated to a temperature of 25 to 45° C. The reason for this is that, if water temperature is lower than the above range, dispersity and dehydration are reduced, and if water temperature is higher than the above range, the raw material mixture and a mesh in step (c) may be overworked. For these reasons, it is preferable for the temperature of the solvent to be within the above range.

In step (c), which is a step of laminating the raw material mixture on a mesh belt, the raw material mixture in a slurry state prepared at the above mixing ratio is laminated on the mesh belt. Specifically, the raw material mixture is supplied to the mesh belt at a speed of 15 to 30 m/min, and it is preferable for the supply rate of the raw material mixture to be 9,000 to 10,000 L/min.

In step (d), which is a step of dehydrating the raw material mixture laminated on the mesh belt, the raw material mixture laminated on the mesh belt is hydrated to primarily remove the solvent, i.e. water, from the raw material mixture.

At this time, dehydration is performed by applying primary vacuum to the raw material mixture the moment the raw material mixture is laminated on the mesh belt and then additionally applying secondary vacuum to the raw material mixture.

Primary vacuum dehydration is performed through four vacuum pressure application steps. In the first step, a vacuum pressure of 0 to 5 cmHg is applied. In the second step, a vacuum pressure of 10 to 20 cmHg is applied. In the third step, a vacuum pressure of 30 to 40 cmHg is applied. In the fourth step, a vacuum pressure of 50 to 65 cmHg is applied. Binding between fibers is induced through the primary vacuum dehydration, and therefore non-woven fabric type ceramic paper is manufactured.

Secondary vacuum dehydration is performed by applying a vacuum pressure of about 18 to 22 cmHg. As a result, residual moisture is removed from the raw material mixture, and at the same time binding between fibers is more densely performed.

Finally, in step (e), which is a step of drying the raw material mixture, residual moisture is completely removed from the raw material mixture. This step is performed by allowing the raw material mixture to sequentially pass through a hot air dryer and a drum dryer. Specifically, the raw material mixture is primarily dried in the hot air dryer at a temperature of 100 to 170° C., preferably 110 to 130° C., is secondarily dried in the hot air dryer at a temperature of 135 to 145° C., is tertiarily dried in the hot air dryer at a temperature of 100 to 110° C., and is quaternarily dried in the drum dryer at a temperature of 135 to 145° C.

If drying is performed at a high temperature in the initial stage of the drying step, drying is rapidly performed, whereby shrinkage or paper fracture may occur. If drying is performed at a low temperature, on the other hand, complete binding of binder fiber is not achieved, and residual moisture is large after winding, whereby negative influences, such as fluffing or reduction of binding force, are exerted on a subsequent process. For these reasons, it is preferable for the drying step to be performed under the four-step drying conditions from primary drying to quaternary drying.

Subsequently, a process of slitting the raw material mixture using a slitter and a process of storing the slit raw material mixtures may be further performed as needed.

Hereinafter, the present invention will be described with reference to examples and an experimental example. However, the following examples and experimental example merely illustrate the present invention, and the details of the present invention are not limited to the following examples and experimental example.

EXAMPLES

Example 1

10,000 L of water, 75 kg of ceramic fiber, 15 kg of an organic binder, 10 kg of an inorganic binder, 3 kg of polyaluminium chloride (PAC) and 1.5 kg of cationic-polyacrylamide (C-PAM) as retention aids, 2.5 kg of polyethylene glycol (PEG) as a dispersant, and 1.5 kg of polyethylene oxide (PEO) as a thickening agent were prepared.

Polycrystalline alumina fiber having an alumina content of 72%, a fiber diameter of 4 to 10 μm, a loss of ignition (LOI) of 0.1% or less, a thermal conductivity (W/mK) of 0.44 or less at a temperature of 1,200° C., and a heat shrinkage of 1% or less at a temperature of 1,600° C. for 8 hours was used as the ceramic fiber.

The organic binder had the shape of chopped fiber having a fineness of 1.0 to 2.0 dtex, a fiber length of 3 to 5 mm, and a solution temperature of 60 to 80° C., and silica sol having a $SiO_2$ content of 32% was used as the inorganic binder.

Polyaluminium chloride (PAC) had a solid content of 14%, and cationic-polyacrylamide (C-PAM) had a weight-average molecular weight (Mw) of 10 million. In addition, polyethylene glycol (PEG) contained 7 to 9 mole of ethylene oxide (EO), and polyethylene oxide (PEO) had a molecular weight (MWCO) of 5 million.

First, the water, the dispersant, and the thickening agent were introduced into a pulper and were stirred for a predetermined time. Subsequently, the polycrystalline alumina fiber and the organic binder were simultaneously introduced into the pulper and were stirred at 750 rpm for 10 minutes. Subsequently, the inorganic binder and the retention aids were sequentially further supplied to the pulper and were stirred at 750 rpm for 10 minutes to prepare a raw material mixture.

The prepared raw material mixture was laminated on a microfiber mesh belt. At this time, the conveying speed of the mesh belt was 30 m/min, and the supply rate of the raw material mixture was 10,000 L/min.

At this time, basis weight was set to about 40 g/m².

The moment the raw material mixture was laminated on the mesh belt, natural dehydration was performed at a vacuum pressure of 0 cmHg in a first step. Subsequently, dehydration was performed at a vacuum pressure of 10 cmHg in a second step, dehydration was performed at a vacuum pressure of 30 cmHg in a third step, and dehydration was performed at a vacuum pressure of 50 cmHg in a fourth step. As a result, primary dehydration was performed.

After primary dehydration, secondary dehydration was performed at a vacuum pressure of 20 cmHg.

Finally, the raw material mixture was primarily dried in a hot air dryer at a temperature of 110 to 130° C., was secondarily dried in the hot air dryer at a temperature of 135 to 145° C., was tertiarily dried in the hot air dryer at a temperature of 100 to 110° C., and was allowed to pass through a drum dryer at a temperature of 135 to 145° C. such that residual moisture was removed from the raw material mixture, whereby ceramic paper was manufactured.

Example 2

Ceramic paper was manufactured under the same conditions as in Example 1 except that 80 kg of polycrystalline alumina fiber, 10 kg of an organic binder, 10 kg of an inorganic binder, 2.0 kg of polyethylene glycol (PEG) as a dispersant, and 1.0 kg of polyethylene oxide (PEO) as a thickening agent were included in a raw material mixture.

Example 3

Ceramic paper was manufactured under the same conditions as in Example 1 except that 90 kg of polycrystalline alumina fiber, 5 kg of an organic binder, 5 kg of an inorganic binder, 1.5 kg of polyethylene glycol (PEG) as a dispersant, and 0.5 kg of polyethylene oxide (PEO) as a thickening agent were included in a raw material mixture.

Example 4

Ceramic paper was manufactured under the same conditions as in Example 1 except that basis weight was set to 60 g/m².

Example 5

Ceramic paper was manufactured under the same conditions as in Example 1 except that basis weight was set to 80 g/m².

COMPARATIVE EXAMPLES

Comparative Example 1

Ceramic paper was manufactured under the same conditions as in Example 1 except that 75 kg of mineral wool was included in a raw material mixture instead of polycrystalline alumina fiber.

Here, mineral wool had an average fiber thickness of 7 μm or less, a density of 140 kg/m³, a thermal conductivity of 0.044 W/mK or less, a particle content rate of 4% or less, and a hot shrinkage temperature of 550° C.

Comparative Example 2

Ceramic paper was manufactured under the same conditions as in Example 1 except that 75 kg of alkali earth silicate was included in a raw material mixture instead of polycrystalline alumina fiber.

Here, alkali earth silicate had a silica content of 73% or more, a fiber diameter of 3 to 12 μm, an LOI of 0.1% or less, and a thermal conductivity of 0.61 W/mK or less.

Comparative Example 3

Ceramic paper was manufactured under the same conditions as in Example 1 except that 75 kg of alumina fiber was included in a raw material mixture instead of polycrystalline alumina fiber.

Here, alumina fiber had an alumina content of 70% or more, a fiber diameter of 4 to 10 μm, an LOI of 0.1% or less, and a thermal conductivity of 0.44 W/mK at a temperature of 1,200° C.

TABLE 1

|  | Water (L) | Main ingredient (kg) | PVA chopped fiber (kg) | Silica sol (kg) | PAC (kg) | C-PAM (kg) | PEG (kg) | PEO (kg) |
|---|---|---|---|---|---|---|---|---|
| Example 1 | 10,000 | Polycrystalline alumina fiber: 75 | 15 | 10 | 3.0 | 1.5 | 2.5 | 1.5 |
| Example 2 | 10,000 | Polycrystalline alumina fiber: 80 | 10 | 10 | 3.0 | 1.5 | 2.0 | 1.0 |
| Example 3 | 10,000 | Polycrystalline alumina fiber: 90 | 5.0 | 5.0 | 3.0 | 1.5 | 1.5 | 0.5 |
| Example 4 | 10,000 | Polycrystalline alumina fiber: 75 | 15 | 10 | 3.0 | 1.5 | 2.5 | 1.5 |
| Example 5 | 10,000 | Polycrystalline alumina fiber: 75 | 15 | 10 | 3.0 | 1.5 | 2.5 | 1.5 |
| Comparative Example 1 | 10,000 | Mineral wool: 75 | 15 | 10 | 3.0 | 1.5 | 2.5 | 1.5 |
| Comparative Example 2 | 10,000 | Alkali earth silicate: 75 | 15 | 10 | 3.0 | 1.5 | 2.5 | 1.5 |
| Comparative Example 3 | 10,000 | Alumina fiber: 75 | 15 | 10 | 3.0 | 1.5 | 2.5 | 1.5 |

Experimental Example

Physical properties of the paper manufactured according to each of Examples 1 to 5 and Comparative Examples 1 to 3 were measured, and the results are shown in Table 2 below.

10 or more samples having a size of 100 cm² were collected in accordance with TAPPI T 410 Standards, the weight of each sample was measured to calculate an average value, and the average value was corrected (corrected value× 100), whereby basis weight was measured.

The thickness of a non-woven fabric was measured using a thickness gauge in accordance with TAPPI T 411 Standards.

Wet tensile strength was measured using a TAPPI T-456 method.

The retention rate was measured using a TAPPI T-261 cm-90 method.

Formation index was measured using a TAPPI T-272 method. Lower formation index means better paper.

Porosity (Bulk) (cm³/g) was measured using a TAPPI T-536 method.

Density was measured using a TAPPI T-258 method.

TABLE 2

|  | Basis weight (g/m²) | Thickness (μm) | Wet tensile strength (N/15 mm) | Retention rate (%) | Formation index | Porosity (cm³/g) | Density (kg/m³) |
|---|---|---|---|---|---|---|---|
| Example 1 | 40.0 | 281 | 3.54/0.78 | 96.3 | 52 | 7.02 | 14.2 |
| Example 2 | 39.5 | — | 3.35/0.73 | 94.5 | 56 | — | — |
| Example 3 | 39.7 | — | 3.56/0.75 | 94.6 | 54 | — | — |
| Example 4 | 60.0 | 382 | — | — | — | 6.36 | 15.7 |
| Example 5 | 80.0 | 482 | — | — | — | 6.02 | 16.5 |
| Comparative Example 1 | 52.5 | 2,100 | — | — | — | 40.0 | 250 |
| Comparative Example 2 | 44.4 | 2,200 | — | — | — | 49.5 | 202 |
| Comparative Example 3 | 23.1 | 1,900 | — | — | — | 82.2 | 121 |

It can be seen from Table 2 that paper having a basis weight of 39.5 to 40.0 g/m² manufactured using the manufacturing method according to each of Examples 1 to 3 of the present invention exhibited excellent physical properties, such as thickness, wet tensile strength, retention rate, and formation index.

Also, it can be seen that, when the basis weight of paper was increased from 40.0 g/m² (Example 1) to 60.0 g/m² (Example 4) or 80.0 g/m² (Example 5), paper had a thickness of 382 μm or 482 μm, i.e. paper was very thin.

However, it can be seen that, in Comparative Examples 1 to 3, the thickness of paper was 1,900 to 2,200 μm, i.e. paper was very thick, even though the basis weight of paper was 23.1 to 52.5 g/m² and that porosity and density of paper were much higher than in Examples of the present invention.

When compared to thermal interface materials that are currently commercially available, therefore, paper according to the present invention has a smaller thickness, whereby it is possible to reduce the volume of paper. In particular, when paper according to the present invention is used in a secondary battery, such as a battery module or a battery pack, as a thermal interface material, it is possible to contribute to improvement in fuel efficiency through weight reduction, since density and porosity thereof are excellent.

The present invention has been described above based on the preferred embodiments thereof. A person having ordinary skill in the art to which the present invention pertains will understand that the present invention can be implemented in modified forms without departing from intrinsic characteristics of the present invention. Therefore, the disclosed embodiments must be considered from an illustrative point of view, rather than a limited point of view. It should be interpreted that the scope of the present invention be defined by the appended claims, not by the above description, and the scope equivalent thereto be included in the present invention.

The invention claimed is:

1. A ceramic paper manufacturing method comprising:
   (a) preparing raw materials;
   (b) mixing the prepared raw materials to prepare a raw material mixture;
   (c) laminating the raw material mixture on a mesh belt;
   (d) dehydrating the raw material mixture laminated on the mesh belt; and
   (e) drying the raw material mixture,
   wherein the raw materials comprise polycrystalline alumina fiber, a binder, retention aids, a dispersant, and a thickening agent, and
   wherein, in step (b), 9,900 to 11,000 parts by weight of water as a solvent, 70 to 95 parts by weight of the polycrystalline alumina fiber, 3 to 18 parts by weight of an organic binder, 3 to 12 parts by weight of an inorganic binder, 2 to 6 parts by weight of polyaluminium chloride (PAC), 1 to 2 parts by weight of cationic-polyacrylamide (C-PAM), 1 to 3 parts by weight of the dispersant, and 0.2 to 2.0 parts by weight of the thickening agent are mixed.

2. The ceramic paper manufacturing method according to claim 1, wherein, in step (b), the polycrystalline alumina fiber and the organic binder are simultaneously mixed, and then the inorganic binder, polyaluminium chloride (PAC), and cationic-polyacrylamide (C-PAM) are sequentially mixed.

3. The ceramic paper manufacturing method according to claim 1, wherein in step (d), the dehydrating the raw material mixture is performed during a primary vacuum dehydration operation having a plurality of dehydration steps and a secondary vacuum dehydration operation having one dehydration step.

4. The ceramic paper manufacturing method according to claim 3, wherein the primary vacuum dehydration operation includes a first step to apply a vacuum pressure of 0 to 5 cmHg, a second step to apply a vacuum pressure of 10 to 20 cmHg, a third step to apply a vacuum pressure of 30 to 40 cmHg, and a fourth step to apply a vacuum pressure of 50 to 65 cmHg.

5. The ceramic paper manufacturing method according to claim 3, wherein the secondary vacuum dehydration operation includes applying a vacuum pressure of about 18 to 22 cmHg.

6. The ceramic paper manufacturing method according to claim 1, wherein, in step (e), the drying the raw material mixture is performed sequentially under a plurality of drying conditions of different temperature ranges.

7. The ceramic paper manufacturing method according to claim 6, wherein the plurality of drying conditions of different temperature ranges include a sequence of primarily drying at a temperature of 110 to 130° C., secondarily drying at a temperature of 135 to 145° C., tertiarily drying a temperature of 100 to 110° C., and quaternarily drying in a temperature of 135 to 145° C.

8. The ceramic paper manufacturing method according to claim 7, wherein the primarily drying, the secondarily drying and the tertiarily drying occur in a hot air dryer, and the quaternarily drying occurs in a drum dryer.

* * * * *